United States Patent
Watanabe et al.

(10) Patent No.: US 9,811,357 B2
(45) Date of Patent: Nov. 7, 2017

(54) VERIFICATION SUPPORT METHOD, VERIFICATION SUPPORTING DEVICE, AND STORAGE MEDIUM

(71) Applicant: FUJITSU LIMITED, Kawasaki-shi, Kanagawa (JP)

(72) Inventors: Yukihiro Watanabe, Kawasaki (JP); Hiroshi Otsuka, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 14/627,476

(22) Filed: Feb. 20, 2015

(65) Prior Publication Data
US 2015/0286488 A1 Oct. 8, 2015

(30) Foreign Application Priority Data
Apr. 4, 2014 (JP) ................. 2014-078217

(51) Int. Cl.
*G06F 15/177* (2006.01)
*G06F 9/445* (2006.01)

(52) U.S. Cl.
CPC .............. *G06F 9/44505* (2013.01)

(58) Field of Classification Search
None
See application file for complete search history.

(56) References Cited

U.S. PATENT DOCUMENTS 8,811,597 B1 * 8/2014 Hackbarth ....... G06Q 10/06393
　　　　　　　　　　　　　　　　　　　　　379/265.02
2004/0024795 A1 * 2/2004 Hind ................. G06F 17/30581

FOREIGN PATENT DOCUMENTS

JP　　　05-067090　　　3/1993
JP　　　2009-003553　　　1/2009

* cited by examiner

*Primary Examiner* — Esther B Henderson
(74) *Attorney, Agent, or Firm* — Staas & Halsey LLP

(57) ABSTRACT

A verification support method includes generating, every time a setting change of a certain computer among a plurality of computers is executed, a configuration change information item that includes one or more setting change information items indicating a content of the setting change of the certain computer and a content of a setting change to be made by a computer other than the certain computer in response to the setting change of the certain computer; calculating a co-occurrence probability for each of combinations of setting change items extracted from a plurality of setting change items included in a plurality of generated configuration change information items; extracting a second setting change item of which a co-occurrence probability when the first setting change item is changed is equal to or larger than a first threshold when information of a first setting change item is received; and outputting the second setting change item.

13 Claims, 19 Drawing Sheets

FIG. 3

| REPRESENTATIVE DATE AND TIME | 10:02:00, NOVEMBER 24, 2013 | | |
|---|---|---|---|
| DATE AND TIME | DEVICE | SETTING ITEM | SETTING VALUE |
| 10:02:05, NOVEMBER 23, 2013 | srv014 | /etc/resolv.conf : nameserver | 192.168.1.10 |
| 10:02:14, NOVEMBER 23, 2013 | srv014 | /etc/resolv.conf : search | example.com |
| 09:16:25, NOVEMBER 25, 2013 | srv028 | /etc/my.ini : max_conn | 32 |
| 09:16:25, NOVEMBER 25, 2013 | srv028 | /etc/httpd/conf/httpd.con : max_conn | 32 |
| ... | ... | ... | ... |

| REPRESENTATIVE DATE AND TIME | 16:18:24, DECEMBER 1, 2013 | | |
|---|---|---|---|
| DATE AND TIME | DEVICE | SETTING ITEM | SETTING VALUE |
| 10:02:00, NOVEMBER 30, 2013 | srv001 | /etc/resolv.conf : server | 192.168.1.1 |
| 10:02:05, NOVEMBER 30, 2013 | srv014 | /etc/resolv.conf : nameserver | 192.168.1.1 |
| 09:15:48, DECEMBER 2, 2013 | srv028 | /etc/my.ini : max_conn | 1024 |
| 09:16:25, DECEMBER 2, 2013 | srv028 | /etc/httpd/conf/httpd.con : max_conn | 256 |
| ... | ... | ... | ... |

FIG. 4

| CHANGE ID | 0056 | | | | |
|---|---|---|---|---|---|
| REPRESENTATIVE DATE AND TIME | 10:02:00, NOVEMBER 24, 2013 | | | | |
| ID | TYPE OF CHANGE | DEVICE | SETTING CHANGE ITEM | SETTING VALUE BEFORE CHANGE | SETTING VALUE AFTER CHANGE |
| 1 | added | srv001 | /etc/ntp.conf : server | – | 192.168.1.10 |
| 2 | modified | srv014 | /etc/resolv.conf : nameserver | 192.168.1.10 | 192.168.1.1 |
| 3 | deleted | srv014 | /etc/resolv.conf : search | example.com | null |
| 4 | modified | srv028 | /etc/my.ini : max_conn | 32 | 1024 |
| 5 | modified | srv028 | /etc/httpd/conf/httpd.con : max_conn | 32 | 256 |
| ... | ... | ... | ... | ... | ... |

| CHANGE ID | 0057 | | | | |
|---|---|---|---|---|---|
| REPRESENTATIVE DATE AND TIME | 16:18:24, DECEMBER 1, 2013 | | | | |
| ID | TYPE OF CHANGE | DEVICE | SETTING CHANGE ITEM | SETTING VALUE BEFORE CHANGE | SETTING VALUE AFTER CHANGE |
| ... | ... | ... | ... | ... | ... |

FIG. 5A

| NUMBER OF CONFIGURATION CHANGES |
|---|
| 57 |

FIG. 5B

| SETTING CHANGE ITEM | FIRST NUMBER OF TIMES OF APPEARANCE |
|---|---|
| /etc/ntp.conf : server | 20 |
| /etc/resolv.conf : nameserver | 40 |
| /etc/my.ini : max_conn | 57 |
| ... | ... |

FIG. 5C

| FIRST SETTING CHANGE ITEM | SECOND SETTING CHANGE ITEM | SECOND NUMBER OF TIMES OF APPEARANCE |
|---|---|---|
| /etc/ntp.conf : server | /etc/resolv.conf : nameserver | 17 |
| /etc/resolv.conf : nameserver | /etc/resolv.conf : search | 26 |
| /etc/my.ini : max_conn | /etc/httpd/conf/httpd.con : max_conn | 44 |
| ... | ... | ... |

FIG. 6

| FIRST SETTING CHANGE ITEM | SECOND SETTING CHANGE ITEM | FIRST NUMBER OF TIMES OF APPEARANCE | SECOND NUMBER OF TIMES OF APPEARANCE | CO-OCCURRENCE PROBABILITY |
|---|---|---|---|---|
| /etc/ntp.conf : server | /etc/resolv.conf : nameserver | 20 | 17 | 0.85 |
| /etc/resolv.conf : nameserver | /etc/resolv.conf : search | 40 | 26 | 0.65 |
| /etc/my.ini : max_conn | /etc/httpd/conf/httpd.con : max_conn | 57 | 44 | 0.77 |
| ... | ... | ... | ... | ... |

FIG. 7

| SETTING CHANGE ITEM | NUMBER OF CONFIGURATION CHANGES | FIRST NUMBER OF TIMES OF APPEARANCE | APPEARANCE PROBABILITY |
|---|---|---|---|
| /etc/httpd/httpd.conf : port | 57 | 1 | 0.02 |
| /etc/ntp.conf : server | 57 | 20 | 0.35 |
| /etc/resolv.conf : nameserver | 57 | 40 | 0.70 |
| /etc/my.ini : max_conn | 57 | 57 | 1.00 |
| ... | ... | ... | ... |

FIG. 8A

| DEVICE | FIRST SETTING CHANGE ITEM | SECOND SETTING CHANGE ITEM | CO-OCCURRENCE PROBABILITY |
|---|---|---|---|
| srv001 | /etc/ntp.conf : server | /etc/resolv.conf : nameserver | 0.85 |
| srv028 | /etc/my.ini : max_conn | /etc/httpd/conf/httpd.conf : max_conn | 0.77 |
| ... | ... | ... | ... |

FIG. 8B

| DEVICE | SETTING CHANGE ITEM | APPEARANCE PROBABILITY |
|---|---|---|
| s r v 123 | /etc/httpd/httpd.conf : port | 0.02 |
| ... | ... | ... |

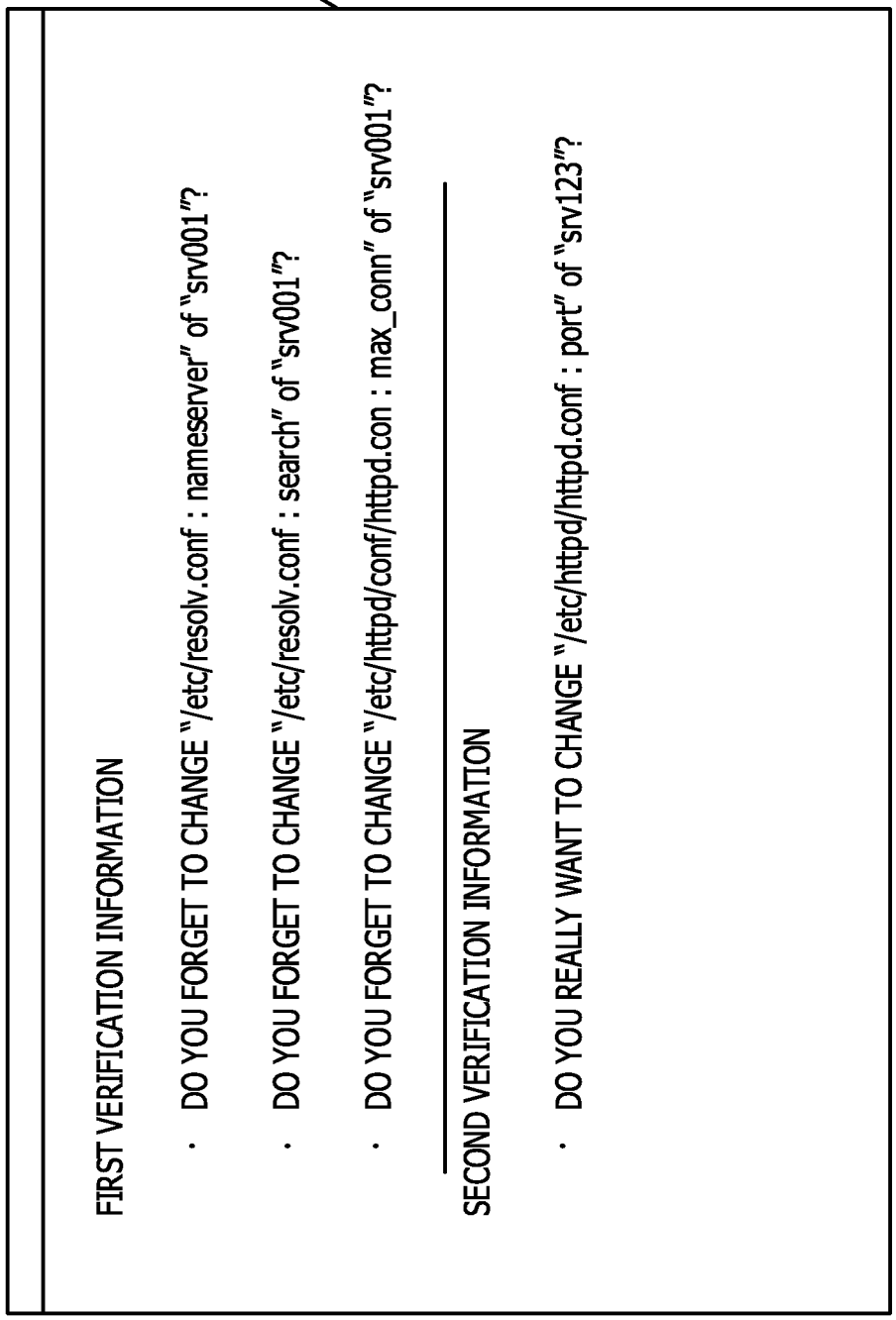

FIG. 16A

| NUMBER OF CONFIGURATION CHANGES |
|---|
| 57 |

FIG. 16B

| SETTING CHANGE ITEM | NUMBER OF TIMES OF APPEARANCE |
|---|---|
| added :: /etc/ntp.conf : server | 12 |
| modified :: /etc/resolv.conf : nameserver | 22 |
| modified :: /etc/my.ini : max_conn | 38 |
| ... | ... |

FIG. 16C

| FIRST SETTING CHANGE ITEM | SECOND SETTING CHANGE ITEM | CO-OCCURRENCE RANGE | NUMBER OF TIMES OF APPEARANCE |
|---|---|---|---|
| /etc/ntp.conf : server | /etc/resolv.conf : nameserver | intenal_node | 12 |
| /etc/resolv.conf : nameserver | /etc/resolv.conf : search | inter_node | 22 |
| /etc/my.ini : max_conn | /etc/httpd/conf/httpd.con : max_conn | both | 38 |
| ... | ... | ... | ... |

FIG. 17

| FIRST SETTING CHANGE ITEM | SECOND SETTING CHANGE ITEM | CO-OCCURRENCE RANGE | NUMBER OF TIMES OF APPEARANCE OF SETTING CHANGE ITEM | NUMBER OF TIMES OF APPEARANCE OF COMBINATION OF SETTING CHANGE ITEMS | CO-OCCURRENCE PROBABILITY |
| --- | --- | --- | --- | --- | --- |
| /etc/ntp.conf : server | /etc/resolv.conf : nameserver | internal_node | 20 | 12 | 0.60 |
| /etc/resolv.conf : nameserver | /etc/resolv.conf : search | inter_node | 40 | 22 | 0.55 |
| /etc/my.ini : max_conn | /etc/httpd/conf/httpd.con : max_conn | both | 57 | 38 | 0.67 |
| ... | ... | ... | ... | ... | ... |

FIG. 18

| SETTING CHANGE ITEM | NUMBER OF CONFIGURATION CHANGES | FIRST NUMBER OF TIMES OF APPEARANCE | APPEARANCE PROBABILITY |
|---|---|---|---|
| added :: /etc/httpd/httpd.conf : port | 57 | 1 | 0.02 |
| added :: /etc/ntp.conf : server | 57 | 12 | 0.21 |
| modified :: /etc/resolv.conf : nameserver | 57 | 22 | 0.39 |
| modified :: /etc/my.ini : max_conn | 57 | 38 | 0.67 |
| ... | ... | ... | ... |

VERIFICATION SUPPORT METHOD, VERIFICATION SUPPORTING DEVICE, AND STORAGE MEDIUM

CROSS-REFERENCE TO RELATED APPLICATION

This application is based upon and claims the benefit of priority of the prior Japanese Patent Application No. 2014-078217, filed on Apr. 4, 2014, the entire contents of which are incorporated herein by reference.

FIELD

The embodiment discussed herein is related to a verification support method, a verification supporting device, and a storage medium.

BACKGROUND

There is a system that executes a predetermined process using a plurality of computers. Settings may be changed in the computers that form the system. For example, if a new application is installed in any of the computers, or if an installed application is upgraded to a new version, or the like, a setting of the computer may be changed.

For example, if a setting of one application is changed, a setting of another application, operating system (OS), or the like may be changed. Alternatively, a setting of a computer other than the computer in which the application is installed may be changed as well as the setting of the computer in which the application is installed.

As a related-art technique, a technique for calculating a duplicated time period in which files are used, substituting a parameter related to the duplicated time period into a predetermined equation, and calculating relevance has been disclosed. A technique for registering related documents, displaying document names related to a certain document edited upon the edition of the certain document, and prompting modification has been also disclosed. As related art, Japanese Laid-open Patent Publication No. 2009-003553 and Japanese Laid-open Patent Publication No. 5-67090 have been disclosed.

When a setting of a computer is changed, another setting of a part may be supposed to be changed. In this case, if the part of which the setting is supposed to be changed, the part is verified. For example, an administrator or the like verifies the change in the setting based on a procedure document for the change in the setting. However, the accuracy of the verification may vary depending on skills of the administrator who performs the verification. If the number of parts to be verified is large, it is difficult to verify changes in settings.

SUMMARY

According to an aspect of the invention, a verification support method executed by a processor included in a verification supporting device coupled to a system including a plurality of computers, the verification supporting device being configured to support a change in a setting of software to be executed by any of the plurality of computers, the verification support method includes generating, every time a setting change of a certain computer among the plurality of computers is executed, a configuration change information item that includes one or more setting change information items indicating a content of the setting change of the certain computer and a content of a setting change to be made by a computer other than the certain computer in response to the setting change of the certain computer; calculating a co-occurrence probability indicating a probability at which when one of setting change items is changed, the other setting change item is changed, for each of combinations of setting change items extracted from a plurality of setting change items included in a plurality of generated configuration change information items; extracting a second setting change item of which a co-occurrence probability when the first setting change item is changed is equal to or larger than a first threshold, from the plurality of configuration change information items, when information of a first setting change item is received from any of the plurality of computers; and outputting the extracted second setting change item.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of configuration information items;

FIG. 4 is a diagram illustrating an example of configuration change information items;

FIGS. 5A, 5B, and 5C are diagrams illustrating an example of various types of information generated by a number information generator;

FIG. 6 is a diagram illustrating an example of a co-occurrence probability of each combination of setting change items;

FIG. 7 is a diagram illustrating an example of an appearance probability of each setting change item;

FIGS. 8A and 8B are diagrams illustrating an example of first verification information and an example of second verification information;

FIG. 15 is a diagram illustrating an example of a screen displaying the first verification information and the second verification information;

FIGS. 16A, 16B, and 16C are diagrams illustrating an example of various types of information stored in a number information storage unit according to a first modified example;

FIG. 17 is a diagram illustrating an example of a co-occurrence range and co-occurrence probability of each combination of setting change items according to the first modified example;

FIG. 18 is a diagram illustrating an example of an appearance probability of each setting change item according to the first modified example.

DESCRIPTION OF EMBODIMENT

Figure 1:
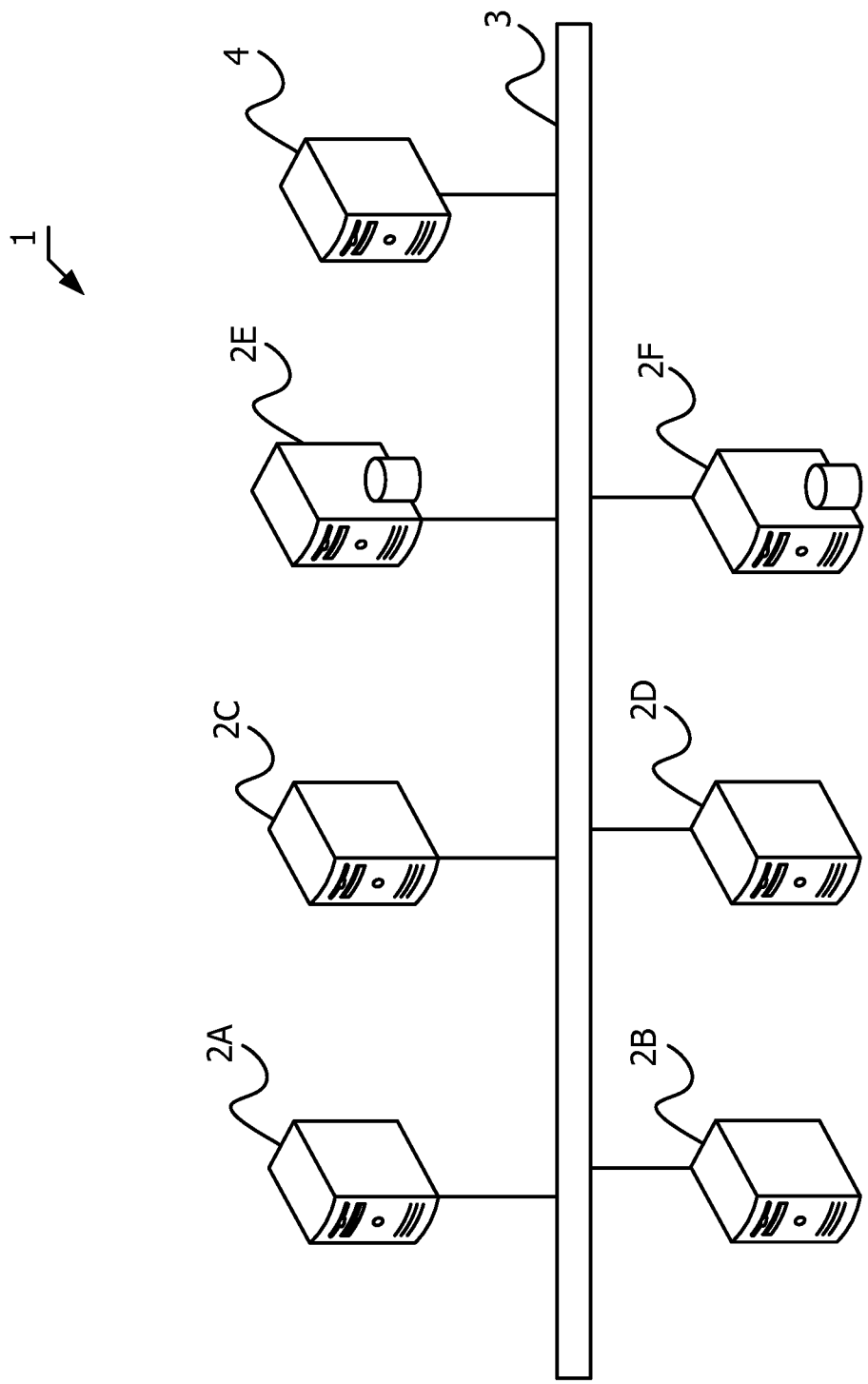
FIG. 1 is a block diagram illustrating an example of a system.

Hereinafter, an embodiment is described with reference to the accompanying drawings. FIG. 1 illustrates an example of a system 1. As an example, in the system 1, a plurality of servers 2A, 2B, 2C, 2D, 2E, and 2F (hereinafter collectively referred to as servers 2) are connected to a network switch 3. The servers 2 communicate with each other.

Arbitrary servers such as application servers, web servers, and database servers may be used as the servers 2 according to the embodiment. The servers 2 are an example of devices. In the embodiment, software such as applications is executed on OSs of the servers 2. A single server 2 executes a predetermined process independently in some cases, while multiple servers 2 coordinate with each other and execute a predetermined process in some cases.

In the example illustrated in FIG. 1, a verification supporting device 4 is connected to the network switch 3 and communicates with the network switch 3. Thus, the verification supporting device 4 communicates with the servers 2. The verification supporting device 4 may serve as a managing server. An administrator who manages the system 1 may use the verification supporting device 4 to manage the system 1.

Figure 2:
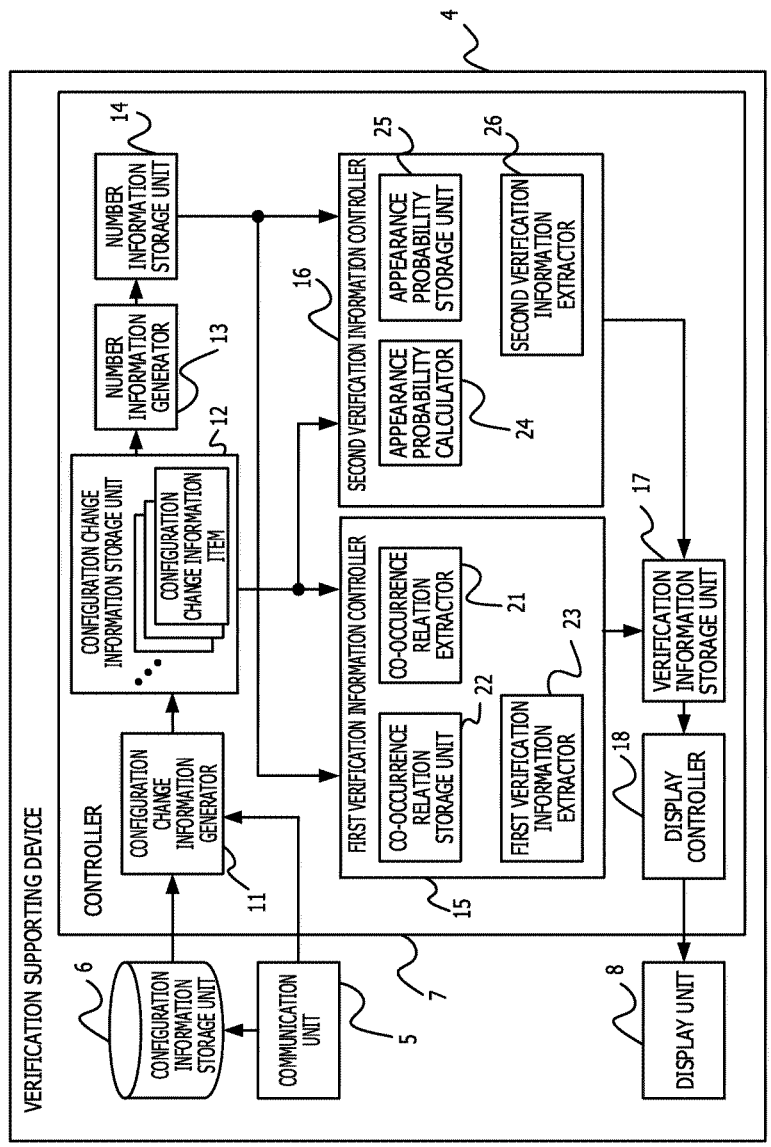
FIG. 2 is a block diagram illustrating an example of a verification supporting device.

FIG. 2 illustrates an example of the verification supporting device 4. The verification supporting device 4 includes a communication unit 5, a configuration information storage unit 6, a controller 7, and a display unit 8. The configuration information storage unit 6 may be arranged outside the verification supporting device 4. For example, the configuration information storage unit 6 may be an independent database and may be connected to the network switch 3.

The communication unit 5 communicates with the servers 2 through the network switch 3. The communication unit 5 regularly or irregularly acquires configuration information items from the servers 2. The acquisition of the configuration information items is referred to as a snapshot in some cases.

If a setting of any of the servers 2 that form the system 1 is changed, the interested server 2 transmits, to the verification supporting device 4, a notification representing that the setting is changed. The notification is referred to as an information update instruction in some cases. The communication unit 5 receives the information update instruction. The verification supporting device 4 may recognize, based on the information update instruction, that the setting of the server 2 has been changed.

As an example, the configuration information items have various setting items of the servers 2. For example, the configuration information items are a "configuration" file, an "ini" file, and the like. The setting items are "nameserver", "max_conn", and the like that are included in these files. The communication unit 5 acquires configuration information items from the servers 2 at time intervals of one week, one day, or one hour. The communication unit 5 may irregularly acquire the configuration information items.

The configuration information items regularly or irregularly acquired by the communication unit 5 are stored in the configuration information storage unit 6. By storing the configuration information items, configuration information items previously stored in the configuration information storage unit 6 are updated. The embodiment assumes that the configuration information storage unit 6 chronologically stores the acquired configuration information items. The configuration information storage unit 6, however, may not chronologically store the acquired configuration information items.

FIGS. 3A and 3B illustrate examples of the configuration information items stored in the configuration information storage unit 6. FIG. 3A illustrates an example of configuration information items of a representative date and time "10:02:00, Nov. 24, 2013". FIG. 3B illustrates an example of configuration information items of a representative date and time "16:18:24, Dec. 1, 2013".

The representative dates and times represent representative dates and times of the configuration information items that are periodically updated. If times when the communication unit 5 collects the configuration information items from the servers 2 are different, dates and times when the setting items are acquired are different. Thus, the configuration information items have information of the representative dates and times. The representative dates and times may be averages of dates and times when the setting items are acquired.

As illustrated in FIGS. 3A and 3B, each of the configuration information items has a date and time, a device, a setting item, and a setting value for a respective setting item. Each row of the configuration information items illustrated in FIGS. 3A and 3B represents information related to a single setting item.

The date and time represents a date and time when the communication unit 5 acquires a setting item from a server 2. The device represents information identifying a device that has transmitted a configuration information item. In the example illustrated in FIGS. 3A and 3B, the devices identify servers 2. The setting item represents information related to a setting of the server 2. The setting value represents a value related to the setting item.

For example, the top row illustrated in FIG. 3A represents a setting item related to a server "srv014" on a date and time "10:02:05, Nov. 23, 2013". The setting item is "/etc/resolv.conf:nameserver".

For example, the setting item "/etc/resolv.conf:nameserver" is related to "nameserver" of a setting file "/etc/resolv.conf" stored in the server "srv014". A setting value of the setting item is "192.168.1.10". In this case, the setting value represents an Internet Protocol (IP) address.

The setting values are not limited to IP addresses. For example, a setting value "example.com" represents a domain name. Each of setting values "32" and "1024" represents the number of devices able to be simultaneously connected to a device of a setting item. The setting values are not limited to IP addresses, domain names, and the numbers of devices able to be simultaneously connected.

The controller 7 receives the configuration information items from the configuration information storage unit 6. The controller 7 executes a predetermined process based on the received configuration information items. The display unit 8 displays predetermined information under control by the controller 7. For example, the display unit 8 may be a display.

The controller 7 includes a configuration change information generator 11, a configuration change information storage unit 12, a number information generator 13, a number information storage unit 14, a first verification information controller 15, a second verification information controller 16, a verification information storage unit 17, and a display controller 18.

The first verification information controller 15 includes a co-occurrence relation extractor 21, a co-occurrence relation storage unit 22, and a first verification extractor 23. The first verification information controller 15 is an example of a controller. The second verification information controller 16 includes an appearance probability calculator 24, an appearance probability storage unit 25, and a second verification information extractor 26.

The configuration change information generator 11 compares two configuration information items acquired at different times with each other and extracts a setting item having a changed setting value. The configuration change information generator 11 is an example of a generator. Hereinafter, a setting item having a changed setting value is referred to as a setting change item. Thus, a setting item having an unchanged setting value is not extracted as a setting change item.

For example, if there is a change in text data of two setting values to be compared, the configuration change information generator 11 may determine that there is a change in a setting item, and the configuration change information generator 11 may extract the interested setting item as a setting change item. If there is a change in the two setting values to be compared, the configuration change information generator 11 may determine that there is a change in a setting item, and the configuration change information generator 11 may extract the interested setting item as a setting change item.

The configuration change information generator 11 acquires at least information including a setting change item. Hereinafter, the information is referred to as a setting change information item. A setting change information item is acquired for each setting change item extracted by the configuration change information generator 11. The configuration change information generator 11 generates a configuration change information item as information including the setting change information item. The configuration change information generator 11 causes the generated configuration change information item to be stored in the configuration change information storage unit 12.

Thus, a configuration change information item includes at least one setting change item. A configuration change information item is generated and stored in the configuration change information storage unit 12 every time a configuration is changed. The configuration change information storage unit 12 stores multiple configuration change information items in some cases and stores a single configuration change information item in some cases.

FIG. 4 illustrates an example of the configuration change information items. A configuration change information item includes a change ID, a representative date and time, and at least one setting change information item. In the example illustrated in FIG. 4, each configuration change information item has, added thereto, a change ID identifying the configuration change information item and includes a representative date and time.

In the example illustrated in FIG. 4, each ID is added to a respective setting change information item. Specifically, information of a row of each ID is a respective setting change information item. In the example illustrated in FIG. 4, setting change information items each include the type of a change, information identifying a device, a setting change item, a setting value before the change, and a setting value after the change. The setting change information items may include other information.

In the example illustrated in FIG. 4, "added", "modified", and "deleted" are illustrated as an example of the types of changes. "Added" represents that a setting item is newly added. "Modified" represents that a setting item is modified. "Deleted" represents that a setting item is deleted. The types of changes are not limited to addition, modification, and deletion.

The setting change information items each include a setting value before a change and a setting value after the change for each setting change item. The setting value before the change represents a setting value before a setting is changed, while the setting after the change represents a setting value after the setting is changed. The configuration change information generator 11 recognizes configuration information items before and after a change. Thus, the configuration change information generator 11 may recognize setting values before and after the change.

In the example illustrated in FIG. 4, a setting change information item of an ID "1" does not include a setting value before a change, while a setting value after the change that is included in the setting change information item of the ID "1" item is "192.168.1.10". A setting value before a change that is included in a setting change information item of an ID "2" is "192.168.1.10", while a setting value after the change that is included in the setting change information item of the ID "2" is changed to "192.168.1.1". A setting value before a change that is included in a setting change information item of an ID "3" is "example.com". Since the setting change information item is deleted, a setting value after the change that is included in the setting change information item of the ID "3" is "null".

The number information generator 13 generates, based on the configuration change information items stored in the configuration change information storage unit 12, number information that is the number of configuration changes, the number of times of appearance of each of setting change items, and the number of times of appearance of each combination of the setting change items. FIGS. 5A, 5B, and 5C illustrate examples of various types of the information generated by the number information generator 13.

The number of configuration changes represents the number of changes in configuration information items. The number of configuration changes corresponds to the number of configuration change information items stored in the configuration change information storage unit 12. In the example illustrated in FIG. 5A, the number of configuration changes is "57".

The number information generator 13 generates, as the first number of times of appearance, the number of setting change items included in each of the configuration change information items stored in the configuration change information storage unit 12. In the example illustrated in FIG. 5B, the number of setting change items "/etc/ntp.conf:server" included in all the configuration change information items is "20". In this case, the first number of times of appearance of the setting change item "/etc/ntp.conf:server" is "20".

The number information generator 13 generates, as the second number of times of appearance, the number of combinations of simultaneously appearing setting change items among setting change items included in each of the configuration change information items stored in the configuration change information storage unit 12.

The example illustrated in FIG. 5C assumes that "/etc/ntp.conf:server" exists as a first setting change item and "/etc/resolv.conf:nameserver" exists as a second setting change item. In the example illustrated in FIG. 5C, the number of the first and second setting change items that simultaneously appear and are included in the configuration change information items is "17".

The number information generator 13 causes the generated number of the configuration changes, the generated numbers of times of appearance of the setting change items, and the generated numbers of times of appearance of the combinations of the setting change items to be stored in the number information storage unit 14. The number of the configuration changes that is illustrated in FIG. 5A, the first numbers of times of appearance that are illustrated in FIG. 5B, and the second numbers of times of appearance that are illustrated in FIG. 5C, are examples and are not limited to the numbers illustrated in FIGS. 5A, 5B, and 5C.

Next, the first verification information controller 15 is described. The co-occurrence relation extractor 21 of the first verification information controller 15 acquires, from the number information storage unit 14, the first numbers of times of appearance of the setting change items and the second numbers of times of appearance of pairs of the setting change items. The co-occurrence relation extractor 21 calculates co-occurrences probability based on the acquired first numbers of times of appearance and the acquired second numbers of times of appearance.

FIG. 6 illustrates an example of the co-occurrence probability for the combinations of the setting change items. First setting change items represent the numbers of times of appearance of the setting change items illustrated as an example in FIG. 5B. The setting change items illustrated in FIG. 5B are the first setting change items illustrated in FIG. 6. The combinations of the first setting change items and the second setting change items are the same as those illustrated in the example of FIG. 5C.

The co-occurrence relation extractor 21 calculates co-occurrence probability based on the numbers, stored in the number information storage unit 14 and illustrated in FIG. 5B, of times of appearance of the setting change items and the numbers, stored in the number information storage unit 14 and illustrated in FIG. 5C, of times of appearance of the combinations of the setting change items. The co-occurrence relation extractor 21 acquires the co-occurrence probability by dividing the second numbers of times of appearance by the first numbers of times of appearance.

In the example illustrated in FIG. 6, a co-occurrence probability at which the first setting change item "/etc/ntp.conf:server" and the second setting change item "/etc/resolv.conf:nameserver" simultaneously appear is 0.85 (=17/20) obtained by dividing the second number of times of appearance by the first number of times of appearance.

The co-occurrence relation extractor 21 calculates co-occurrence probability of all combinations of first setting change items and second setting change items. Then, the co-occurrence relation extractor 21 causes a table illustrated as an example in FIG. 6 to be stored in the co-occurrence relation storage unit 22. The co-occurrence relation extractor 21 causes the co-occurrence probability of the pairs of the setting change items to be stored in the co-occurrence relation storage unit 22. A format to be stored in the co-occurrence relation storage unit 22 is not limited to a table format as long as the co-occurrence probability of the pairs of the setting change items are identified.

The first verification information extractor 23 extracts second setting change items that are each likely to appear simultaneously with a first setting change item. The first verification information extractor 23 has, set therein, a threshold for the co-occurrence probability and extracts a combination of first and second setting change items of which an occurrence probability is equal to or larger than the threshold. This threshold is referred to as a first threshold. The first threshold may be arbitrarily set. The first verification information extractor 23 is an example of an extractor.

The first verification information extractor 23 extracts a setting change item that is among the extracted second setting change items and is not included in setting change items based on changes made from a previous information update instruction to a current information update instruction. The first verification information extractor 23 causes first verification information in which the extracted setting change item is associated with a first setting change item to be stored in the verification information storage unit 17.

Next, the second verification information extractor 26 is described. The appearance probability calculator 24 of the second verification information extractor 26 acquires the number of configuration changes from the number information storage unit 14. The appearance probability calculator 24 acquires, from the number information storage unit 14, the number of times of appearance of each of the setting items illustrated as the example in FIG. 5B.

FIG. 7 illustrates an example of appearance probability of setting change items. In the example illustrated in FIG. 7, the setting change items, the number of configuration changes, the first numbers of times of appearance, and appearance probability are illustrated as a table format. The appearance probability calculator 24 divides the first numbers of times of appearance by the number of the configuration changes. In the example illustrated in FIG. 7, the number of configuration changes of a setting change item "/etc/httpd/httpd.conf:port" is "57", and the first number of times of appearance of the setting change item "/etc/httpd/httpd.conf:port" is "1".

The appearance probability calculator 24 calculates 0.02 (=1/57) by dividing the number of the configuration changes by the first number of times of appearance. The appearance probability calculator 24 calculates appearance probability of the setting change items based on the numbers, stored in the number information storage unit 14, of times of appearance of the setting change items. The appearance probability calculator 24 causes the calculated appearance probability of the setting change items to be stored in the appearance probability storage unit 25.

The second verification information extractor 26 extracts a setting change item of which an appearance probability is low and that is among the setting change items stored in the appearance probability storage unit 25. The second verification information extractor 26 has a threshold stored therein and extracts a setting change item of which an appearance probability is equal to or smaller than the threshold. This threshold is referred to as a second threshold. The second threshold may be arbitrarily set.

If a setting change item of which an appearance probability is equal to or smaller than the second threshold is included in the setting change items changed from the previous information update instruction to the current information update instruction, the second verification information extractor 26 extracts the interested setting change item. The second verification information extractor 26 causes second verification information including the extracted setting change item to be stored in the verification information storage unit 17.

The verification information storage unit 17 stores the first verification information extracted by the first verification information extractor 23 of the first verification information controller 15 and the second verification information extracted by the second verification information extractor 26 of the second verification information controller 16. FIGS. 8A and 8B illustrate an example of the first verification information stored in a table and an example of the second verification information stored in a table, respectively.

In the verification information storage unit 17, first and second setting change items that are extracted by the first verification information extractor 23 and of which an co-occurrence probability is equal to or larger than the first threshold are associated with each other and stored. In addition, in the verification information storage unit 17, a setting change item that is extracted by the second verification information extractor 26 and of which an appearance probability is equal to or larger than the second threshold is stored. The verification information storage unit 17 is an example of a storage unit.

The display controller 18 controls the display unit 8 so as to display the first verification information stored in the verification information storage unit 17 and the second verification information stored in the verification information storage unit 17 on the display unit 8. If the first or second verification information is stored in the verification information storage unit 17, the display controller 18 displays the verification information stored in the verification information storage unit 17 on the display unit 8.

Next, examples of processes according to the embodiment are described with reference to flowcharts. Settings of the servers 2 that form the system 1 may be changed. For example, if a new application is installed in any of the servers 2, or an application installed in any of the servers 2 is updated, or the like, a setting of the interested server 2 is changed.

If a setting of any of the servers 2 that form the system 1 is changed, the communication unit 5 of the verification supporting device 4 receives an information update instruction and a configuration information item from the interested server 2. The communication unit 5 outputs the information update instruction to the configuration change information generator 11.

Figure 9:
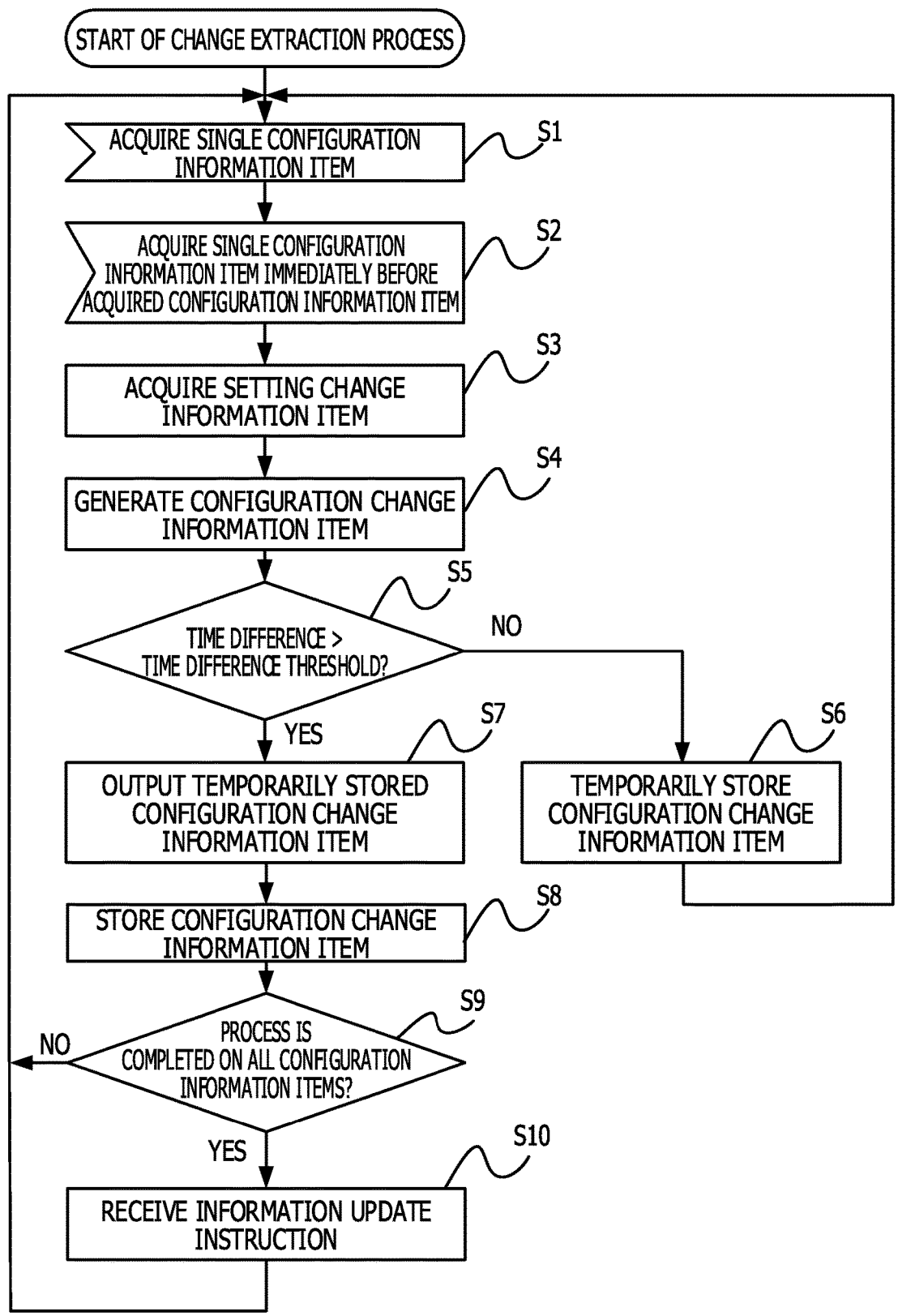
FIG. 9 is a flowchart of an example of a change extraction process.

FIG. 9 illustrates an example of a process to be executed by the configuration change information generator 11. Hereinafter, the process to be executed by the configuration change information generator 11 is referred to as a change extraction process in some cases. The configuration change information generator 11 acquires a single configuration information item from the configuration information storage unit 6 (in S1).

The configuration change information generator 11 acquires, from the configuration information storage unit 6, a configuration information item immediately before the configuration information item acquired in S1 (in S2). The configuration change information generator 11 acquires, based on the configuration information item acquired in S1 and the configuration information item acquired in S2, a setting change information item including a changed setting item (in S3). Then, the configuration change information generator 11 generates a configuration change information item that includes at least the acquired setting change information item and may have one or more setting change information items (in S4).

Next, the configuration change information generator 11 calculates a time difference between a date and time when a previous information update instruction is received and a date and time when a current information update instruction is received, and the configuration change information generator 11 determines whether or not the calculated time difference exceeds a set time difference threshold (in S5). Thus, the configuration change information generator 11 stores the times when the information update instructions are received.

If the time difference does not exceed the time difference threshold (NO in S5), the configuration change information generator 11 causes the configuration change information item generated in S4 to be stored in a temporal storage unit (in S6). Then, the process returns to S1.

On the other hand, if the time difference exceeds the time difference threshold (YES in S5), the configuration change information generator 11 causes the configuration change information item stored in the temporal storage unit to be output to the configuration change information storage unit 12 (in S7).

Figure 10:
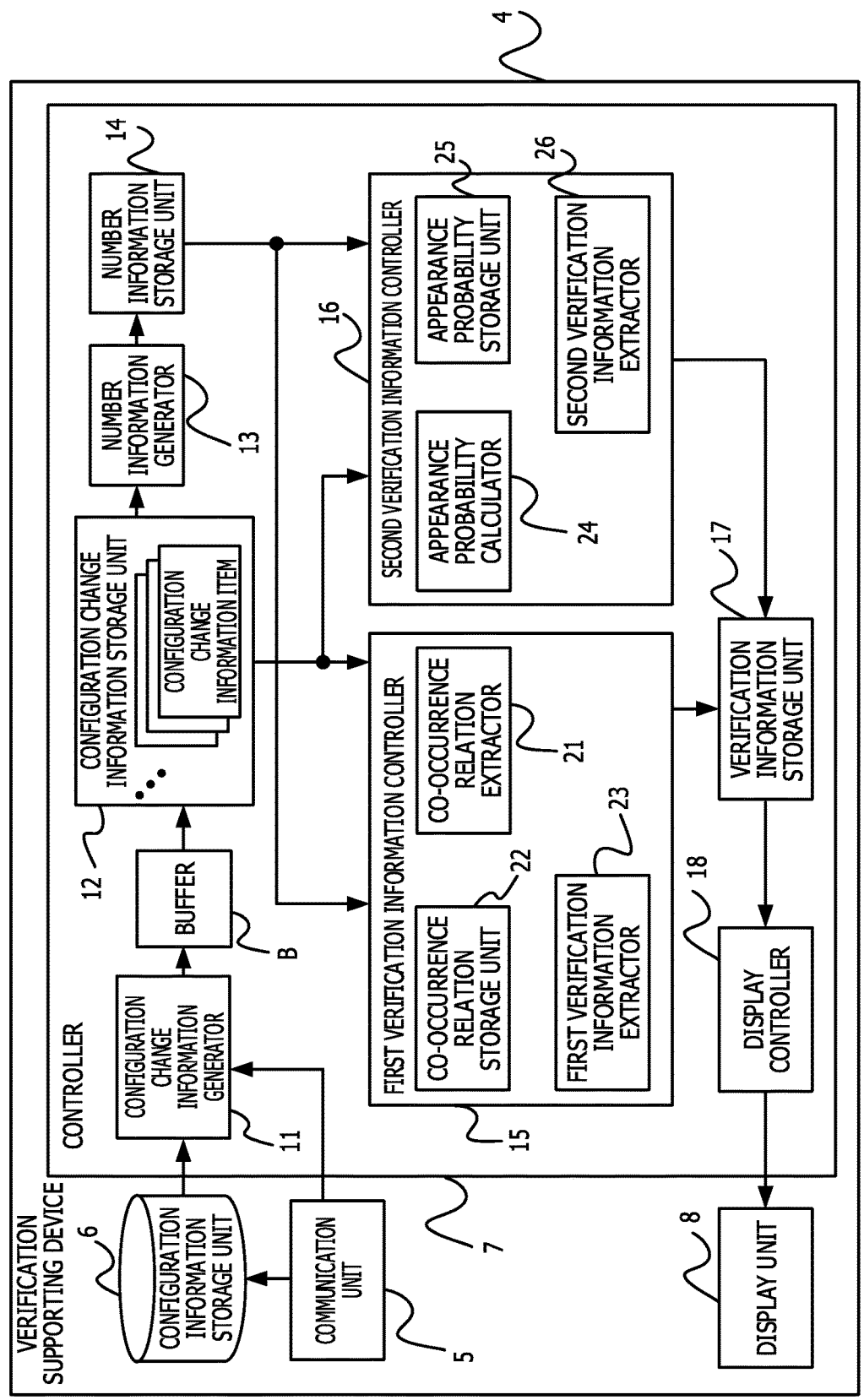
FIG. 10 is a block diagram illustrating another example of the verification supporting device.

Hereinafter, S6 and S7 are described. The temporal storage unit may be installed between the configuration change information generator 11 and the configuration change information storage unit 12. The temporal storage unit is a cache or the like, for example. The temporal storage unit is described below as a buffer B. FIG. 10 illustrates an example in which the buffer B is installed between the configuration change information generator 11 and the configuration change information storage unit 12 illustrated in FIG. 2.

The configuration change information generator 11 causes the generated configuration change information item to be temporarily stored in the buffer B. Multiple configuration change information items are accumulated in the buffer B with time. Then, after a certain time elapses, the configuration change information generator 11 may cause the multiple configuration change information items to be stored together in the configuration change information storage unit 12.

Every time the configuration change information generator 11 generates a single configuration change information item, the configuration change information generator 11 may cause the generated configuration change information item to be stored in the configuration change information storage unit 12. However, there is an advantage in terms of a process load and a process speed in the case where the configuration change information generator 11 causes multiple configuration change information items to be temporarily stored in the buffer B and causes the configuration change information items to be stored together in the configuration change information storage unit 12 after a predetermined time elapses after the temporal storage of the multiple configuration change information items in the buffer B.

For example, if the configuration change information generator 11 causes configuration change information items to be stored in the buffer B at long time intervals of one week, one day, or the like, the buffer B is effective. In this case, the time different threshold is one week, one day, or the like.

In the aforementioned manner, the configuration change information items illustrated as the example in FIG. 4 are stored in the configuration change information storage unit 12 (in S8). The configuration change information generator 11 determines whether or not a process of generating configuration change information items for all configuration information items stored in the configuration information storage unit 6 is completed (in S9). If a configuration information item that is yet to be subjected to the process remains (NO in S9), processes of S1 to S8 are repeated.

By the aforementioned processes, the configuration change information items are generated for all the configuration information items stored in the configuration information storage unit 6 and are stored in the configuration change information storage unit 12. On the other hand, if the process is completed on all the configuration information items (YES in S9), the configuration change information generator 11 waits to receive a next information update instruction. When the communication unit 5 receives the next information update instruction and the configuration change information generator 11 receives the next information update instruction (in S10), the process is restarted from S1.

Figure 11:
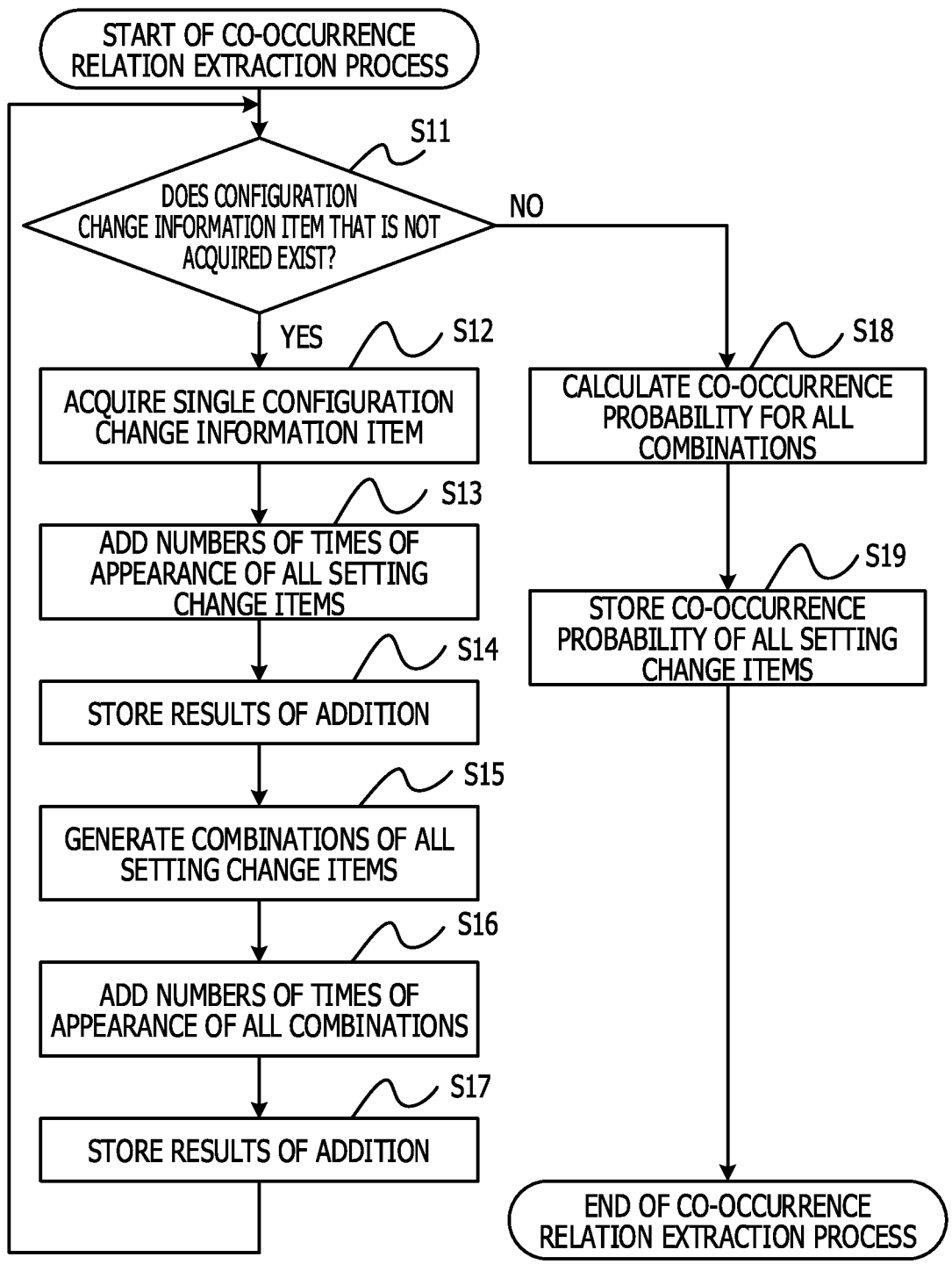
FIG. 11 is a flowchart of an example of a co-occurrence relation extraction process.

Next, an example of a co-occurrence relation extraction process is described with reference to a flowchart of FIG. 11. The number information generator 13 acquires a configuration change information item from the configuration change information storage unit 12. In this case, the number information generator 13 determines whether or not the configuration change information item that is not acquired exists (in S11).

If the configuration change information item that is not acquired exists (YES in S11), the number information generator 13 acquires the single configuration change information item from the configuration change information storage unit 12 (in S12). The number information generator 13 adds the numbers of times of appearance of all setting change items included in the acquired configuration change information item to the first numbers of times of appearance (in S13). The numbers of times of appearance of all the setting change items are equal to the first numbers of times of appearance of the setting change items, as illustrated as the example in FIG. 5B. Initial values of the first numbers of times of appearance are "0".

For example, if five setting change items "/etc/ntp.conf: server" are included in the acquired configuration change information item, the number information generator 13 adds "5" to the interested first number of times of appearance. Then, the number information generator 13 causes the aforementioned setting change items and the results of the addition to the first numbers of times of appearance to be associated with each other and stored in the number information storage unit 14 (in S14).

The number information generator 13 generates combinations of all the setting change items included in the acquired configuration change information item (in S15). Then, the number information generator 13 adds the numbers of times of appearance of the combinations of all the setting change items to second numbers of the times of appearance (in S16). The numbers of times of appearance of the combinations are equal to the second numbers of times of appearance of the combinations of the setting change items, as illustrated as the example in FIG. 5C. Initial values of the second numbers of times of appearance are "0".

For example, if a single combination of the first setting change item "/etc/ntp.conf:server" and the second setting change item "/etc/resolv.conf:nameserver" is included in the acquired configuration change information item, the number information generator 13 adds "1" to the interested second number of times of appearance. Then, the number information generator 13 causes the combinations of the first and second setting change items and the second numbers of times of appearance to be associated with each other and stored in the number information storage unit 14 (in S17).

The aforementioned processes of S12 to S17 are executed on all configuration change information items stored in the configuration change information storage unit 12. Thus, the tables of the number information illustrated as the examples in FIGS. 5B and 5C are stored in the number information storage unit 14.

The co-occurrence relation extractor 21 calculates co-occurrence probability for all setting change items stored in the number information storage unit 14 (in S18). The co-occurrence relation extractor 21 references the table stored in the number information storage unit 14 and provided for the numbers of times of appearance of the setting change items. Then, the co-occurrence relation extractor 21 extracts the first number of times of appearance of a single setting change item.

Next, the co-occurrence relation extractor 21 references the table stored in the number information storage unit 14 and provided for the numbers of times of appearance of combinations of the setting change items. The co-occurrence relation extractor 21 extracts the second number of times of appearance of the single setting change item (first setting change item) of which the first number of times of appearance has been extracted. Then, the co-occurrence relation extractor 21 calculates a co-occurrence probability by dividing the interested second number of times of appearance by the interested first number of times of appearance.

In the example illustrated in FIG. 5B, the first number of times of appearance of the setting change item "/etc/ntp-.conf:server" among the setting change items is "20". In the example illustrated in FIG. 5C, "/etc/ntp.conf:server" is the first setting change item, "/etc/resolv.conf:nameserver" is the second setting change item, and the second number of times of appearance of the combination of the first and second setting change items is "17".

Thus, the co-occurrence relation extractor 21 calculates a co-occurrence probability of the aforementioned first and second setting change items as "0.85 (=17/20)". The co-occurrence relation extractor 21 calculates co-occurrence probability of all the combinations of the first and second setting change items. Then, the co-occurrence relation extractor 21 causes combinations of the co-occurrence probability, the first setting change items, and the second setting change items to be stored in the co-occurrence relation storage unit 22.

Next, an example of a process of storing first verification information is described with reference to a flowchart of FIG. 12. The first verification information extractor 23 acquires a single configuration change information item to be evaluated (in S21). The configuration change information item to be evaluated is a configuration information item changed from a previous information update instruction to a current information update instruction. For example, a configuration change information item of which a representative date and time is latest is the configuration change information item to be evaluated.

The first verification information extractor 23 determines whether or not all setting change items included in the configuration change information item to be evaluated have been evaluated (in S22). The configuration change information item to be evaluated may include the multiple setting change items. The first verification information extractor 23 determines whether or not all the setting change items have been evaluated. If the configuration change information item to be evaluated includes only a single setting change item, the first verification information extractor 23 determines whether or not the single setting change item has been evaluated.

The first verification information extractor 23 extracts a single setting change item from the configuration change information item to be evaluated (in S23). The first verification information extractor 23 treats the extracted setting change item as a first setting change item and confirms an interested co-occurrence probability stored in the co-occurrence relation storage unit 22 (in S24).

The first verification information extractor 23 determines whether or not the confirmed co-occurrence probability is equal to or larger than the first threshold (in S25). As described above, the first verification information extractor 23 has the first threshold stored therein. The first threshold may be arbitrarily set.

The first threshold may be set to a certain value. For example, the first threshold may be set to "0.5". The first threshold may be set so as to ensure that the highest probability among co-occurrence probability stored in the co-occurrence relation storage unit 22 or a predetermined percent of the co-occurrence probability stored in the co-occurrence relation storage unit 22 are equal to or larger than the first threshold. For example, the first threshold may be set so as to ensure that the highest 50% of the co-occurrence probability may be equal to or larger than the first threshold.

If the co-occurrence probability is smaller than the first threshold (NO in S25), the process proceeds to S22. If the co-occurrence probability is equal to or larger than the first threshold (YES in S25), the first verification information extractor 23 determines whether or not a second setting change item is included in the configuration change information item to be evaluated (in S26). The aforementioned second setting change item is a setting change item of which relevance with the first setting change item is high.

If the second setting change item is included in the configuration change information item to be evaluated (YES in S26), the process proceeds to S22. On the other hand, if the second setting change item is not included in the configuration change information item to be evaluated (NO in S26), the first verification information extractor 23 extracts the second setting change item as first verification information (in S27).

The aforementioned process is described below with reference to the example illustrated in FIG. 6. For example, it is assumed that the setting change item "/etc/ntp.conf:server" is extracted from the configuration change information item to be evaluated in S23. The extracted setting change item is a first setting change item.

The first verification information extractor 23 determines whether or not a co-occurrence probability of the setting change item "/etc/ntp.conf:server" treated as the first setting change item is equal to or larger than the first threshold. If the co-occurrence probability of the first setting change item is smaller than the first threshold, a probability that the first setting change item and a second setting change item are both changed is low.

Since relevance between the first setting change item and the second setting change item is low, the probability that the first and second setting change items are simultaneously changed is low. On the other hand, if the co-occurrence probability is equal to or larger than the first threshold, the relevance between the first setting change item and the second setting change item is high. Thus, the probability that the first and second setting change items are simultaneously changed is high.

If the answer to the determination of S26 is NO, the second setting change item that is likely to be changed, as well as the first setting change item is not included in the configuration change information item. For example, the co-occurrence probability of the first setting change item "/etc/ntp.conf:server" extracted in S23 and the second setting change item "/etc/resolv.conf:nameserver" is high. Specifically, the probability that the setting change items are simultaneously changed is high.

If the second setting change item "/etc/ntp.conf:server" is not included in the configuration change information item to be evaluated regardless of the aforementioned fact, there is a possibility that the second setting change item "/etc/ntp.conf:server" may not be changed.

The first verification information extractor 23 extracts, as first verification information, the second setting change item "/etc/ntp.conf:server" that may not be changed. The first verification information extractor 23 executes the processes of S23 to S27 on all the setting change items of the configuration change information item to be evaluated.

When the first verification information extractor 23 evaluates all the setting change items of the configuration change information item to be evaluated (YES in S22), the first verification information extractor 23 causes the extracted first verification information to be stored in the verification information storage unit 17 (in S28). Thus, the two setting change items of which the co-occurrence probability is equal to or larger than the first threshold are associated with each other and stored in the verification information storage unit 17. Then, the process of storing first verification information is terminated.

Figure 13:
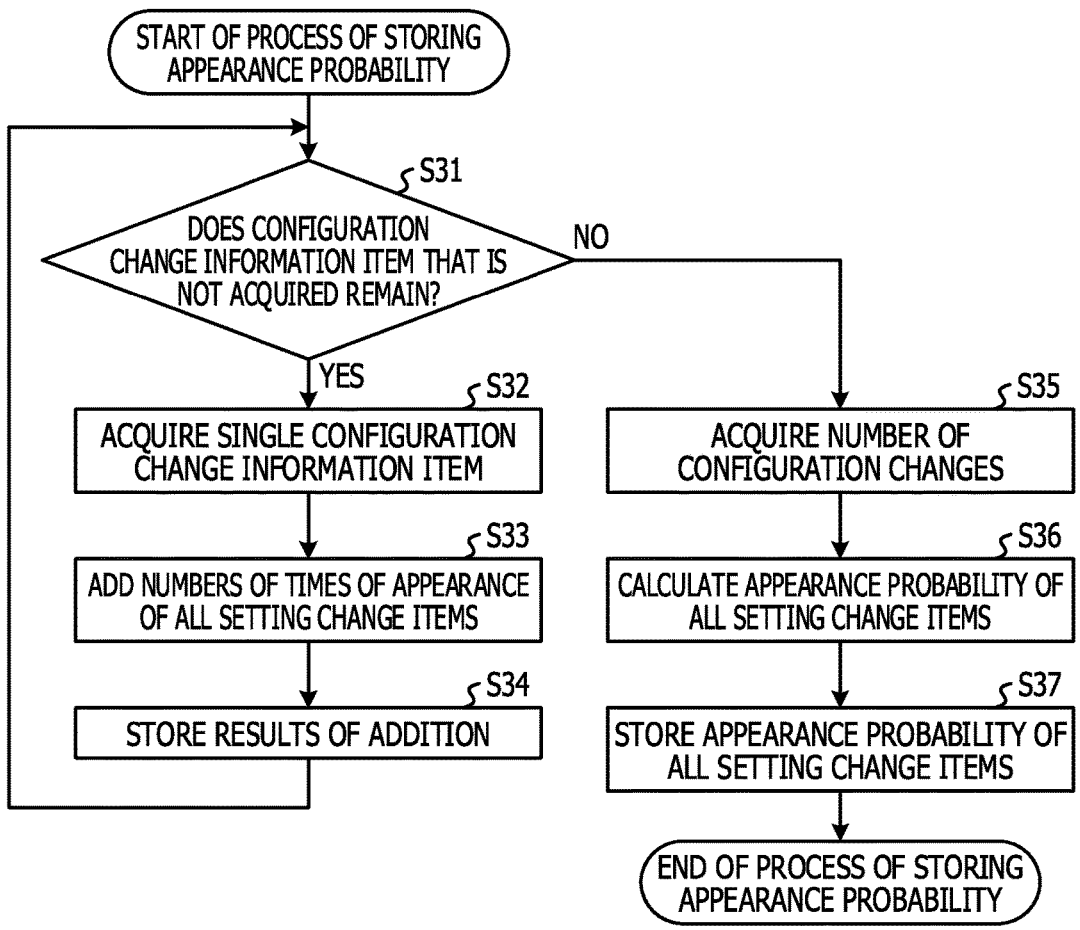
FIG. 13 is a flowchart of an example of a process of storing appearance probability.

Next, an example of a process of storing appearance probability is described with reference to a flowchart of FIG. 13. The number information generator 13 acquires a configuration change information item from the configuration change information storage unit 12. In this case, the number information generator 13 determines whether or not the configuration change information item that is not acquired exists (in S31).

If the configuration change information that is not acquired exists (YES in S31), the number information generator 13 acquires the single configuration change information item from the configuration change information storage unit 12 (in S32). The number information generator 13 adds the numbers of times of appearance of setting change items included in the acquired configuration change information item to first numbers of times of appearance (in S33). The numbers of times of appearance are added to the first numbers of times of appearance of the setting change items, as illustrated as the example in FIG. 5B. Initial values of the numbers of times of appearance are "0".

For example, if a single setting change item "/etc/http/httpd.conf:port" is included in the acquired configuration change information item, the number information generator 13 adds "1" to the interested first number of times of appearance. Then, the number information generator 13 causes the aforementioned setting change item and the results of the addition to the first numbers of times of appearance to be associated with each other and stored in the number information storage unit 14 (in S34).

The number information generator 13 repeatedly executes the processes of S32 to S34 on all configuration change information items stored in the configuration change information storage unit 12. Thus, as illustrated in the example of FIG. 7, the numbers of times of appearance of the setting change items may be acquired. The numbers of times of appearance are illustrated as the first numbers of times of appearance in the example of FIG. 7.

If the configuration change information item that is not acquired does not exist (NO in S31), the appearance probability calculator 24 of the second verification information extractor 26 acquires the number of configuration changes from the number information storage unit 14 (in S35).

The appearance probability calculator 24 acquires the first numbers of times of appearance of the setting change items from the number information storage unit 14. The appearance probability calculator 24 calculates appearance probability of the setting change items by dividing the first numbers of times of appearance by the number of configuration changes (in S36).

For example, an appearance probability of the setting change item "/etc/http/httpd.conf:port" among the setting change items is "0.02 (=2/57)". The appearance probability calculator 24 causes the appearance probability of the setting change items to be stored in the appearance probability storage unit 25 (in S37). Then, the process of storing appearance probability is terminated.

Figure 14:
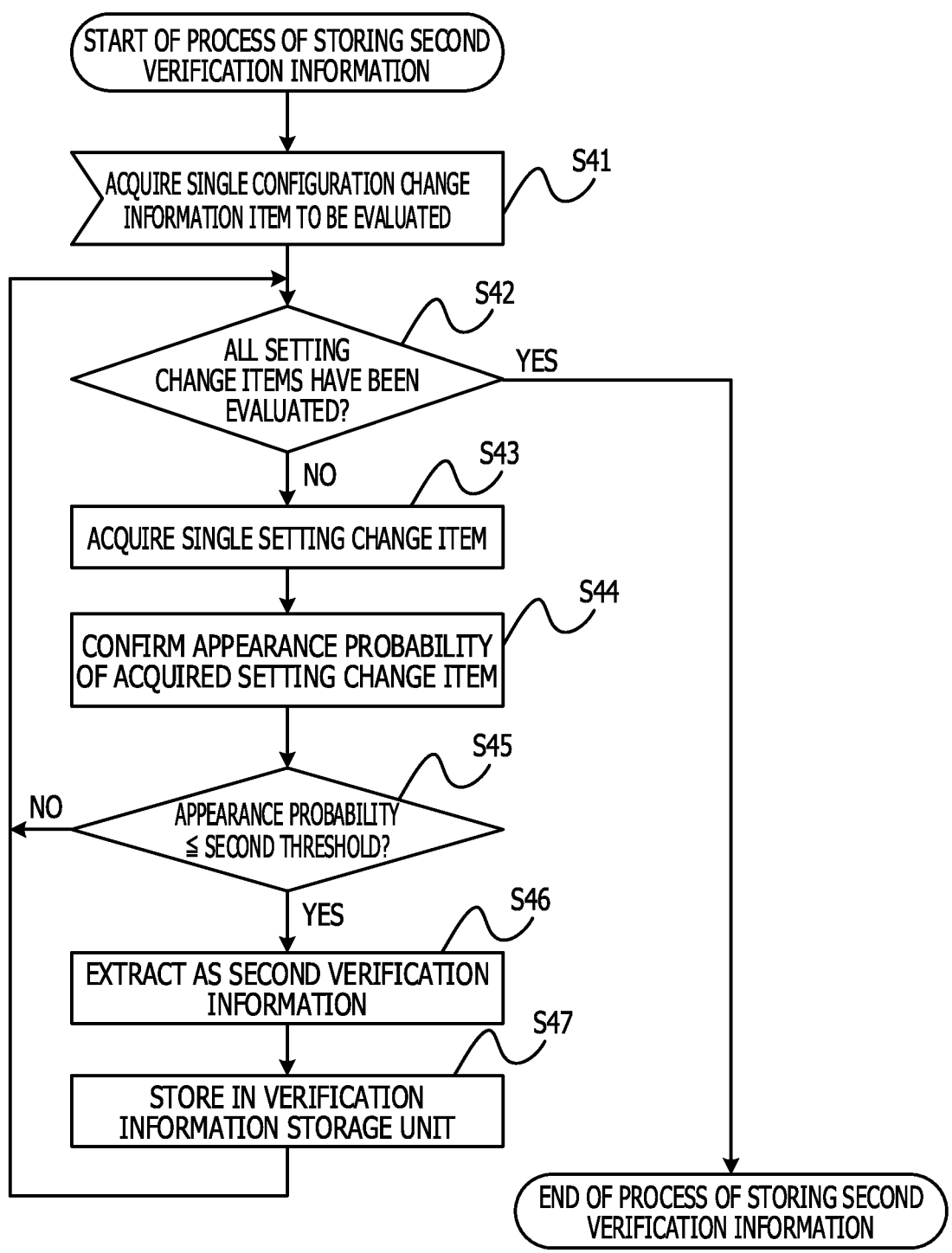
FIG. 14 is a flowchart of an example of a process of storing second verification information.

Next, an example of a process of storing second verification information is described with reference to a flowchart of FIG. 14. The second verification information extractor 26 acquires a single configuration change information item to be evaluated (in S41). The configuration change information item to be evaluated is a configuration information item changed from the previous information update instruction to the current information update instruction.

The second verification information extractor 26 determines whether or not all setting change items of the configuration change information item to be evaluated have been evaluated (in S42). If the multiple setting change items are included in the configuration change information item, the second verification information extractor 26 determines whether or not all the setting change items have been evaluated. If the configuration change information item includes only a single setting change item, the second verification information extractor 26 determines whether or not the setting change item has been evaluated.

The second verification information extractor 26 extracts a single setting change item from the configuration change information item to be evaluated (in S43). The second verification information extractor 26 confirms an interested appearance probability stored in the appearance probability storage unit 25 (in S44).

The second verification information extractor 26 determines whether or not the confirmed appearance probability is equal to or smaller than the second threshold (in S45). The second verification information extractor 26 has the second threshold stored therein. The second threshold may be arbitrarily set.

The second threshold may be set to a certain value. For example, the second threshold may be set to "0.05". The second threshold may be set so as to ensure that the lowest appearance probability that are a predetermined percent of all appearance probability stored in the appearance probability storage unit 25 are equal to or smaller than the second threshold. For example, the second threshold may be set so as to ensure that the lowest 5% of all the appearance probability stored in the appearance probability storage unit 25 are equal to or smaller than the second threshold.

If the appearance probability is larger than the second threshold (NO in S45), the process proceeds to S42. If the appearance probability is equal to or smaller than the second threshold (YES in S45), the second verification information extractor 26 extracts a setting change item of which an appearance probability is equal to or smaller than the second threshold (in S46).

The aforementioned process is described with reference to FIG. 7. For example, in the table illustrated in FIG. 7, the appearance probability of the setting change item "/etc/httpd/httpd.conf:port" is "0.02". Thus, the answer to the determination of S45 executed on the interested setting change item is YES.

The setting change item of which the appearance probability is "0.02" represents a setting item corresponding to a setting that is not likely to be changed. The second verification information extractor 26 extracts the setting change item corresponding to the setting changed regardless of the fact that the setting is not likely to be changed.

The setting change item is the setting item that is not likely to be changed. The second verification information extractor 26 causes the extracted setting change item to be stored as second verification information in the verification information storage unit 17 (in S47). Thus, the extracted setting change item may be a setting item that is not supposed to be changed.

The processes of S43 to S47 are executed on all the setting change items of the configuration change information item to be evaluated. When all the setting change items of the configuration change information item to be evaluated are evaluated, the process of storing second verification information is terminated.

In this manner, as illustrated as the examples in FIGS. 8A and 8B, the first verification information and the second verification information are stored in the verification information storage unit 17. The first verification information illustrated in FIG. 8A represents that one of each pair of setting items that are supposed to be changed from the previous information update instruction to the current information update instruction is not changed regardless of high relevance.

Specifically, the first verification information illustrated in FIG. 8A represents that there is a possibility that setting items that are supposed to be changed may not be actually changed. When a setting of any of the servers 2 that form the system 1 is changed, the verification of a change in a setting may be supported by storing the first verification information in the verification information storage unit 17.

The second verification information illustrated in FIG. 8B represents the setting change item of which the appearance probability is low among the setting items changed from the previous information update instruction to the current information update instruction. Thus, the second verification information represents that there is a possibility that the setting item that is not supposed to be changed is to be changed. When a setting of any of the servers 2 that form the system 1 is changed, the verification of a change in a setting may be supported by storing the second verification information in the verification information storage unit 17.

Thus, the verification information storage unit 17 may recognize that there is a possibility that a setting item that is supposed to be changed may not be changed and that there is a possibility that a setting that is not supposed to be changed may be changed. The first and second verification information stored in the verification information storage unit 17 may be displayed on the display unit 8, for example.

The display controller 18 acquires the first verification information and the second verification information from the verification information storage unit 17. Then, the display controller 18 displays the first verification information and the second verification information on the display unit 8. FIG. 15 illustrates an example of the first and second verification information displayed on the display unit 8.

First verification information illustrated as an example in FIG. 15 represents setting items of which co-occurrence probability are equal to or larger than "0.5". Thus, the display controller 18 displays, on the display unit 8, attention information representing that there is a possibility that settings corresponding to the setting items of which the co-occurrence probability are equal to or larger than "0.5" are not changed. In the display example of FIG. 15, servers 2 are identified for the setting items. Information of the servers 2 may be displayed based on the configuration change information items illustrated as the example in FIG. 4.

Second verification information illustrated as an example in FIG. 15 represents a setting item of which a co-occurrence probability is equal to or smaller than "0.05". The display controller 18 displays, on the display unit 8, attention information representing that there is a possibility that the setting item may be unnecessarily changed. In the example of FIG. 15, a server 2 is identified for the second verification information. Information of the server 2 may be displayed based on the configuration change information items illustrated as the example in FIG. 4, as described above.

For example, the administrator visually confirms the information displayed on a screen illustrated as the example in FIG. 15 and may thereby recognize that a setting item that is supposed to be changed is not changed and that a setting item that is not supposed to be changed is changed. Thus, when a setting of any of the servers 2 that form the system 1 is changed, the verification of the setting change may be supported.

The first verification information and the second verification information that are displayed in FIG. 15 are the examples and are not limited to the display example of FIG. 15. Other information may be added to the first verification information and the second verification information. Any of the first verification information and the second verification information may be displayed on the display unit 8.

Next, a first modified example is described. FIGS. 16A, 16B, and 16C illustrate an example of various types of information stored in the number information storage unit 14 according to the first modified example. In FIG. 16B, the information identifies how setting change items are changed. A table illustrated as an example in FIG. 16C has an item for co-occurrence ranges of setting change items.

In the first modified example, the co-occurrence ranges are three types, "internal_node", "inter_node", and "both". "Internal_node" represents a case where a server 2 of a first setting change item is the same as a server 2 of a second setting change item. Specifically, "internal_node" represents the case where the first setting change item and the second setting change item are changed in the same device.

In this case, if a co-occurrence range of the first and second setting change items is "internal_node", the first and second setting change items are setting items changed in the same device.

"Inter_node" represents a case where a server 2 of a first setting change item is different from a server 2 of a second setting change item. Specifically, "inter_node" represents the case where the first setting change item and the second setting change item are changed in different devices. If a co-occurrence range of first and second setting change items is "inter_node", the first and second setting change items are setting items changed in different devices.

"Both" represents a case where a server 2 of a first setting change item is the same as or different from a server 2 of a second setting change item. Specifically, "both" represents "internal_node" in some cases and represents "inter_node" in some cases.

Whether a co-occurrence range is "internal_node", "inter_ node", or "both" may be recognized based on the configuration change information items illustrated as the example in FIG. 4. In the example of FIG. 16C, if a server 2 of a first setting change item is the same as a server 2 of a second setting change item, a co-occurrence range of the first and second change items is "internal_node". In the example of FIG. 16C, if the server 2 of the first setting change item is different from the server 2 of the second setting change item, the co-occurrence range is "inter_node".

FIG. 17 illustrates an example of co-occurrence ranges and co-occurrence probability for combinations of setting change items. In FIG. 17, the information is illustrated as a table. The verification information storage unit 17 may store verification information including the co-occurrence ranges.

For example, the display controller 18 displays the verification information stored in the verification information storage unit 17 on the display unit 8. Thus, the co-occurrence ranges are displayed on the display unit 8. The administrator may easily recognize whether setting items of a single device or setting items of multiple devices are to be confirmed.

Next, a second modified example is described. FIG. 18 illustrates an example of appearance probability of setting change items. As illustrated in the example of FIG. 18, the types of changes are added to the setting change items. In the example of FIG. 18, a setting change item stored as second verification information in the verification information storage unit 17 is a setting change item of which an appearance probability is "0.02".

In this case, the setting change item of which the appearance probability is "0.02" may be recognized as an added setting change item ("added" in the example of FIG. 18). When a setting item that is not likely to be changed is to be displayed on the display unit 8, the administrator may recognize the type of a change of the setting item by displaying the setting item and the type of the change, or the displaying of the setting item enables the administrator to recognize a large amount of information.

Figure 19:
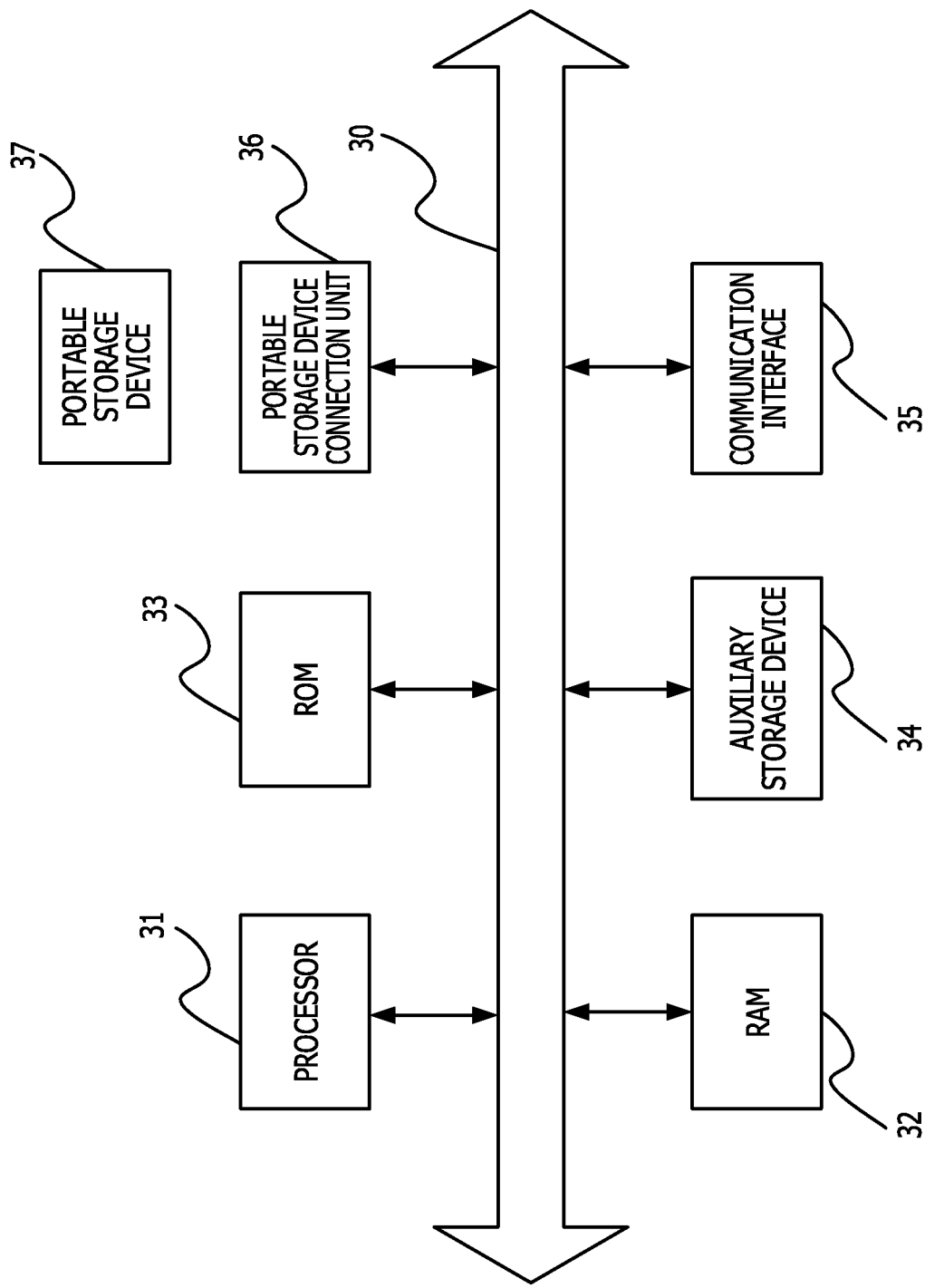
FIG. 19 is a diagram illustrating an example of a hardware configuration of the verification supporting device.

Next, an example of a hardware configuration of the verification supporting device 4 is described. In the example illustrated in FIG. 19, a processor 31, a random access memory (RAM) 32, a read only memory (ROM) 33, an auxiliary storage unit 34, a communication interface 35, and a portable storage device connection unit 36 are connected to each other through a bus 30.

The processor 31 is an arbitrary processing circuit such as a central processing unit (CPU). The processor 31 executes a program loaded in the RAM 32. As the program to be executed, a verification support program that achieves the processes described in the embodiment may be used. The ROM 33 is a nonvolatile storage device configured to store the program loaded in the RAM 32.

The auxiliary storage device 34 is configured to store various types of information. As the auxiliary storage device 34, a hard disk drive, a semiconductor memory, or the like may be used. The communication unit 35 is an interface to be used for communication with an external.

The portable storage device connection unit 36 may be connected to a portable storage device 37. As the portable storage device 37, a portable memory or an optical disc (for example, a compact disc (CD), a digital video disc (DVD), or the like) may be used. The verification support program that achieves the processes described in the embodiment may be stored in a computer-readable storage medium. In this case, the portable storage device 37 may be used as the storage medium.

The RAM 32, the ROM 33, and the auxiliary storage device 34 are examples of tangible computer-readable storage media. The tangible storage media are not temporal media such as signal carrier waves.

The storage units of the verification supporting device 4 may be stored in the auxiliary storage device 34, the RAM 32, and the like. The other parts of the controller 7 that are not the storage units may be achieved by the program executed by the processor 31, for example. When the verification supporting device 4 communicates with the servers 2, the communication interface 35 may be used.

The aforementioned first and second verification information is stored in the verification information storage unit 17. The first and second verification information stored in the verification information storage unit 17 may be used by an arbitrary method. For example, as described above, the first and second verification information stored in the verification information storage unit 17 may be displayed on the display unit 8. The first and second verification information may be accumulated as logs.

Any of the aforementioned first verification information and the aforementioned second verification information may be generated and stored. For example, by storing the first verification information in the verification information storage unit 17, it is possible to recognize that there is a possibility that a setting item that is supposed to be changed may not be changed. By storing the second verification information in the verification information storage unit 17, it is possible to recognize that there is a possibility that a setting item may be unnecessarily changed.

If the first verification information is generated and the second verification information is not generated, the second verification information controller 16 of the verification supporting device 4 illustrated in FIG. 2 may be omitted. On the other hand, if the second verification information is generated and the first verification information is not generated, the first verification information controller 15 may be omitted.

Figure 12:
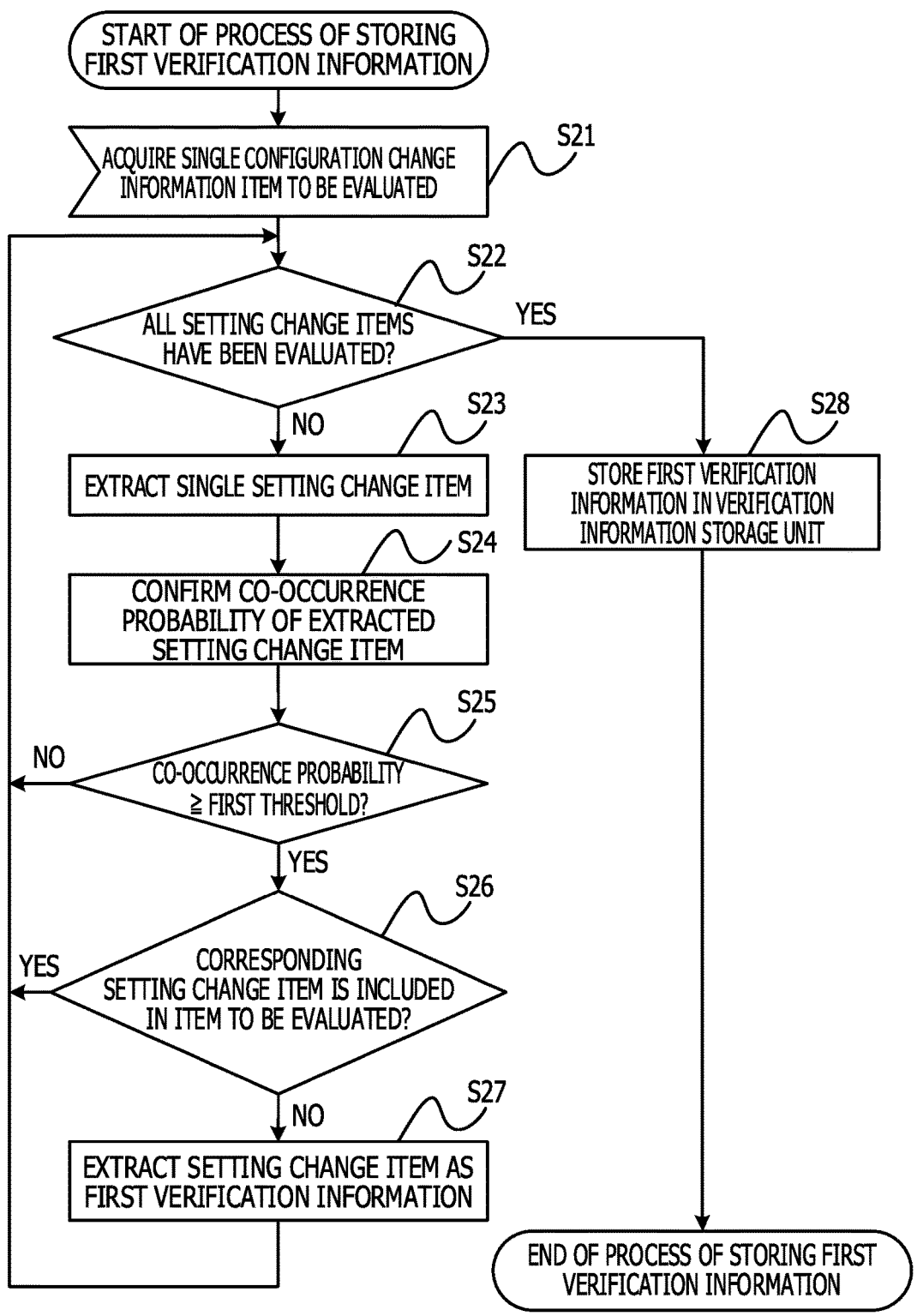
FIG. 12 is a flowchart of an example of a process of storing first verification information.

Although the process of S26 is executed in the example of the flowchart of FIG. 12, the process of S26 may be omitted. In this case, first and second setting change items of which a co-occurrence probability is equal to or larger than the first threshold are associated with each other and extracted as first verification information.

Relevance between the first and second setting change items extracted as the first verification information is high. For example, the administrator may recognize the two setting items of which the relevance in terms of a setting change is high by displaying the first verification information on the display unit 8.

By executing the process of S26 of the flowchart of FIG. 12, a second setting change item of which relevance with a first setting change item is high and that is not included in an item to be evaluated is extracted as first verification information. In this case, the extracted second setting change item is a setting item that is supposed to be changed but may not be changed. Thus, the administrator may easily recognize a setting item that is supposed to be changed but may not be changed.

In the embodiment, the configuration change information generator 11 acquires setting change information items including setting change items based on configuration information items stored in the changed information storage unit 6. The setting change items, however, may be acquired from the servers 2 forming the system 1.

For example, when a server 2 transmits an information update instruction and information of a changed setting item to the verification supporting device 4, the configuration change information generator 11 may acquire a configuration change information item.

The embodiment describes the example of the first and second setting change items. Third and fourth setting change items and the like may be provided. In the example of FIG. 6, three or more types of setting change items may be provided.

Although the disclosed embodiment and its advantages are described above in detail, those skilled in the art may make various changes and various types of addition and omission without departing from the scope of the invention clearly described in claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A verification support method executed by a processor included in a verification supporting device coupled to a system including a plurality of computers, the verification supporting device being configured to support a change in a setting of software to be executed by any of the plurality of computers, the verification support method comprising:

generating, every time a setting change of a certain computer among the plurality of computers is executed, a configuration change information that includes a setting change item changed by the certain computer and one or more setting change items changed by one or more computers which are different from the certain computer in response to the setting change of the certain computer;

calculating, for each of all combinations of two setting change items extracted from the generated configuration change information, a co-occurrence probability indicating a value of a probability of changing a setting change item among the two setting change items when another setting change item among the two setting change items is changed;

extracting a second setting change item of which a co-occurrence probability when the first setting change item is changed is equal to or larger than a first threshold, from the plurality of configuration change information, when information of a first setting change item is received from any of the plurality of computers; and outputting the extracted second setting change item.

2. The verification support method according to claim 1, further comprising:

receiving an instruction to update information registered in the verification supporting device from the interested computer, every time a setting change of any of the plurality of computers is executed; and associating a setting change item among setting change items of which co-occurrence probability are equal to or larger than the first threshold with the first setting change item, the setting change item being not included in configuration change information items changed between a timing of a previous reception of the instruction and a timing of the receiving.

3. The verification support method according to claim 1, wherein the generating includes:

receiving a configuration information item from a certain computer among the plurality of computers when a setting change of the certain computer is executed;

generating a setting change information item corresponding to the setting change of the certain computer based on the received configuration information item and a configuration information item before the setting change of the certain computer which is stored in a memory included in the verification supporting device.

4. The verification support method according to claim 1, wherein each of the one or more setting change information items includes:
   a type of a setting change;
   a computer that is among the plurality of computers and is to be changed;
   the setting change item; and
   information stored in the setting change item and representing setting values before and after the setting change.

5. The verification support method according to claim 1, wherein the calculating of the co-occurrence probability includes:
   counting, for combinations of the setting change items, the numbers of times when the combinations appear in the plurality of configuration change information items; and
   calculating an appearance probability by dividing the counted numbers by the number of the configuration change information items.

6. The verification support method according to claim 1, further comprising:
   calculating an appearance probability indicating a probability at which a setting change is executed, for the plurality of setting change items included in the plurality of configuration change information items; and
   outputting the first setting change item when an appearance probability of the first setting change item is equal to or smaller than a second threshold.

7. The verification support method according to claim 5, wherein the calculating of the appearance probability includes:
   counting, for the plurality of setting change items, numbers of times when the combinations appear in the plurality of the configuration change information items; and
   calculating the appearance probability by dividing the counted numbers by the number of the configuration change information items.

8. The verification support method according to claim 1, further comprising:
   storing a co-occurrence probability indicating a relation between devices of a pair of setting change items of which a co-occurrence probability is equal to or larger than the first threshold.

9. The verification support method according to claim 1, wherein the outputting includes displaying the extracted second setting change item on a display.

10. A non-transitory computer-readable storage medium storing a program that causes a verification supporting device to execute a process, the verification supporting device being coupled to a system including a plurality of computers and configured to support a change in a setting of software to be executed by any of the plurality of computers, the process comprising:
    generating, every time a setting change of a certain computer among the plurality of computers is executed, a configuration change information that includes a setting change item changed by the certain computer and one or more setting change items changed by one or more computers which are different from the certain computer in response to the setting change of the certain computer;
    calculating, for each of all combinations of two setting change items extracted from the generated configuration change information, a co-occurrence probability indicating a value of a probability of changing a setting change item among the two setting change items when another setting change item among the two setting change items is changed;
    extracting a second setting change item of which a co-occurrence probability when the first setting change item is changed is equal to or larger than a first threshold, from the plurality of configuration change information items, when information of a first setting change item is received from any of the plurality of computers; and
    outputting the extracted second setting change item.

11. A verification supporting device coupled to a system including a plurality of computers and is configured to support a change in a setting of software to be executed by any of the plurality of computers, the verification supporting device comprising:
    a memory; and
    a processor coupled to the memory and configured to:
       generate, every time a setting change of a certain computer among the plurality of computers is executed, a configuration change information item that includes a setting change item changed by the certain computer and one or more setting change items changed by one or more computers which are different from the certain computer in response to the setting change of the certain computer;
       calculate, for each of all combinations of two setting change items extracted from the generated configuration change information, a co-occurrence probability indicating a value of a probability of changing a setting change item among the two setting change items when another setting change item among the two setting change items is changed;
       extract a second setting change item of which a co-occurrence probability when the first setting change item is changed is equal to or larger than a first threshold, from the plurality of configuration change information, when information of a first setting change item is received from any of the plurality of computers; and
       output the extracted second setting change item.

12. The verification support method according to claim 1, wherein the calculating includes dividing times of appearance of the setting change item in the configuration change information by times of appearance of the another setting change item in the configuration change information.

13. The verification support method according to claim 4, wherein the type of the setting change includes added, modified and deleted.

* * * * *